(12) United States Patent
Jorgenson (10) Patent No.: US 9,201,291 B2
(45) Date of Patent: Dec. 1, 2015

(54) CAMERA MOUNTING DEVICE (71) Applicant: Tom Jorgenson, Huntington Beach, CA (US)

(72) Inventor: Tom Jorgenson, Huntington Beach, CA (US)

( * ) Notice: Subject to any disclaimer, the term of this patent is extended or adjusted under 35 U.S.C. 154(b) by 0 days.

(21) Appl. No.: 14/145,479

(22) Filed: Dec. 31, 2013

(65) Prior Publication Data
US 2015/0185591 A1 Jul. 2, 2015

(51) Int. Cl.
*G03B 17/00* (2006.01)
*G03B 17/56* (2006.01)

(52) U.S. Cl.
CPC ..................... *G03B 17/561* (2013.01)

(58) Field of Classification Search
CPC .................................................. G03B 17/561
USPC ........................................................ 396/428
See application file for complete search history.

(56) References Cited

U.S. PATENT DOCUMENTS

| 3,833,196 | A | * | 9/1974 | Protzman | 248/208 |
| 4,582,284 | A | * | 4/1986 | Veenstra | 248/220.21 |
| 4,727,390 | A | * | 2/1988 | Brown | 396/420 |
| 5,260,731 | A | * | 11/1993 | Baker, Jr. | 396/428 |
| 5,538,212 | A | * | 7/1996 | Kennedy | 248/215 |
| 5,626,244 | A | * | 5/1997 | Mesna et al. | 211/60.1 |
| 5,927,681 | A | * | 7/1999 | Ovelman | 248/682 |
| D508,251 | S | * | 8/2005 | Tuccinardi et al. | D16/132 |
| 6,991,384 | B1 | * | 1/2006 | Davis | 396/428 |
| D546,366 | S | * | 7/2007 | Dittmer | D16/235 |
| 8,152,389 | B1 | * | 4/2012 | Lammens | 396/419 |
| D663,190 | S | * | 7/2012 | Mota et al. | D8/349 |
| 2003/0128975 | A1 | * | 7/2003 | Shevick | 396/428 |
| 2004/0069919 | A1 | * | 4/2004 | Studer | 248/301 |
| 2006/0086878 | A1 | * | 4/2006 | Cormier | 248/314 |
| 2011/0266406 | A1 | * | 11/2011 | Westimayer et al. | 248/224.8 |
| 2012/0288268 | A1 | * | 11/2012 | Bevirt | 396/428 |
| 2014/0317987 | A1 | * | 10/2014 | Kuehl et al. | 42/90 |

OTHER PUBLICATIONS

LynkSpyder, www.lynkspyder, Aug. 19, 2013.*

* cited by examiner

*Primary Examiner* — Rodney Fuller
(74) *Attorney, Agent, or Firm* — Koppel, Patrick, Heybl & Philpott (57) ABSTRACT

An adjustable mounting device comprising a base member having a top surface and a side surface, an adjustment member removably coupled to the top surface of the base member, and a clamping member removably coupled to the side surface of the base member. The clamping member securing the mounting device to a fence or structure in order to mount a camera or similar device to the fence or structure, such that the camera can be mounted onto the mounting device and has a substantially unobstructed view of events or scenery through the structure to which the mounting device is mounted.

19 Claims, 8 Drawing Sheets

CAMERA MOUNTING DEVICE

BACKGROUND OF THE INVENTION

1. Field of the Invention

This invention relates to adjustable mounts that are well suited to mount a device, such as a camera, onto a structure.

2. Description of the Related Art

In the past, most camera supports have evolved from tripods. Tripods are adequate for still pictures and allow the photographer to stand behind the camera and look through the view finder without having to hold the camera in a steady position. Tripods are used for supporting the weight and maintaining the stability of another object. A tripod provides stability against downward forces, horizontal forces and moments about horizontal axes. The positioning of the three feet away from the vertical center allows the tripod better leverage for resisting lateral forces.

Video cameras and especially hand-held camcorders can be positioned on a tripod and can be left unattended. This is especially true when a sporting event being recorded or photographed is in one room or in one area, such as a baseball field or tennis court. Tripods allow a camera to be set up, the scene reviewed, adjustments made, and then left recording while unattended. A tripod mounted camera is very desirable for people in that they can be part of the action or watch the event as a spectator, eliminating an additional person for recording. Tripods can be large, bulky, can take up a lot of floor space, are often in the way of the action being recorded and could block the view of other spectators of the event being recorded/photographed. It is also desirable to position a camera on or against a wall or surface to get it out of the way of other spectators view, thereby reducing the blocked viewing area as much as possible. This is not possible with a tripod.

An alternative to using a tripod is for a person to manually hold a camera in their hands. When a photograph is taken using a hand-held camera, the camera is usually grasped by the photographer in one hand and positioned in the proximity of the photographer's face. In this position, the photographer can see through the viewfinder of the camera, select the scene to be photographed and then operate the shutter release mechanism. However, it can be difficult to hold the camera steady while the shutter is open. When a person's arms remain in the position required to hold the camera in the proximity of his face more than a few seconds, tensions develop in the hand, wrist and arm. The natural result of this tension is a reflexive high-frequency shaking, with resulting camera movement that blurs the recorded image. This problem is particularly acute where the camera is heavy, a long telephoto lens is used, the photographer is working in an awkward position, the photographer must hold a position for a length of time waiting for a particular scene to occur, and where long exposure times are required because of low light conditions or to increase the depth of field.

Photographing or recording a sporting event could be obstructed due to barriers or structures that are part of the field where the sporting event is taking place, or are designed to provide protection to spectators from being injured from projectiles or other objects that are used during or in conjunction with the sporting event. For example, baseball and softball fields can be fenced in to protect spectators from being hit by a ball that is thrown or hit during the course of the game. The fences are typically chain-link fences and a spectator taking pictures of the game would have an obstructed field of view because the chain-link fence is between the spectator and the game. A spectator could position themselves up against or near the fence so that they could take pictures of the field of play through one of the openings of the chain-link fence. However, the person standing against the chain-link fence would have to manually hold the camera with their hand and would be blocking the view of the spectators behind them.

Placing a camera on a tripod near the fence would still result in the fence obstructing the field of view because the tripod must be positioned a certain distance from the fence due to the nature of the legs extending outward from the center of the tripod. The tripod would not necessarily allow the camera on the tripod to take unobstructed pictures through the openings of the chain-link fence.

There exists a need in many situations to easily and quickly mount a camera in an advantageous position, while at the same time being portable, easy to install, minimize the space the mounted camera takes so as to not be in the way of the action being recorded/photographed, and not be obstructed by the structure to which the camera is mounted.

SUMMARY

The invention provides various embodiments of a camera mounting device that are cost effective, easy to install/uninstall, easily transportable and provide the structural support to receive a camera, such that the camera can be mounted to a fence or structure. The different embodiments comprise elements to provide an adjustable mounting device that can be mounted onto a structure, such that the camera has an unobstructed view through the structure to which the camera mounting device is mounted. The invention is also configured, such that the camera mounting device can be easily installed by a single individual.

In one embodiment, as broadly described herein, a camera mounting device comprises a base member comprising a top surface and a side surface, a clamping member and an adjustment member, wherein said clamping member and said adjustment member are adapted to be detachably coupled to said base member. The side surface is adapted to receive said clamping member and said top surface is adapted to receive said adjustment member. The top surface of said base member comprises at least one slot to receive at least one fastener so as to detachably couple said adjustment member to said base member. The side surface of said base member comprises at least one aperture to receive a clamping device, such that said clamping member is detachably coupled to said base member.

In another embodiment, a camera mounting device comprises a base member comprising a top surface and a side surface, wherein said top surface and said side surface are substantially perpendicular to each other. The camera mounting device further comprises an adjustable clamping member arranged to be detachably coupled to said base member, and an adjustment member adapted to be detachably coupled to said base member and further configured to adjust the positioning of said adjustment member along more than one axis. The top surface further comprises an elongated slot to receive at least one fastener so as to detachably couple said adjustment member to said top surface and to allow said adjustment member to be displaced along said elongated slot. The side surface comprising at least one aperture to receive a clamping device to detachably couple said clamping member to said side surface.

These and other aspects and advantages of the invention will become apparent from the following detailed description and the accompanying drawings, which illustrate by way of example the features of the invention.

BRIEF DESCRIPTION OF THE DRAWINGS

FIG. 7a is a perspective view of a base member according to an embodiment of the invention.

FIG. 7b is a top view of the base member of FIG. 7a.

FIG. 7c is a bottom view of the base member of FIG. 7a.

FIG. 7d is a side view of the base member of FIG. 7a.

FIG. 8b is a bottom view of the adjustment member of FIG. 8a.

FIG. 9b is another perspective view of the clamping member of FIG. 9a.

FIG. 9c is a rear view of the clamping member of FIG. 9a.

FIG. 9d is a side view of the clamping member of FIG. 9a.

FIG. 13b is another perspective view of the clamping member of FIG. 13a.

FIG. 13c is a rear view of the clamping member of FIG. 13a.

FIG. 13d is a side view of the clamping member of FIG. 13a.

DETAILED DESCRIPTION

The invention described herein is directed to different embodiments of a camera mounting device that in some embodiments is adapted to be mounted to a structure, such that the structure does not substantially block the view of a camera or similar device mounted on the camera mounting device. The camera mounting device can comprise many different materials and can be used in many different applications, such as but not limited to photographing or recording a sporting event. The camera mounting device can be arranged in many different ways with many different components, and is generally arranged to be easily mountable to a structure by a single individual. In some embodiments, the camera mounting device can comprise a base member, a clamping member and an adjustment member, wherein the clamping member and the adjustment member are detachably coupled to the base member. The base member is configured such that the clamping member and the adjustment member are substantially perpendicular to each other. The base member comprises a top surface and a side surface, wherein said clamping member is received by said side surface and said adjustment member received by said top surface. The adjustment member is adapted to receive a camera or similar device. The clamping member is configured to apply a force onto a structure or the like so as to mount the camera mounting device to the structure. An advantage of the camera mounting device is that the arrangement of the camera mounting device can easily be adjusted to be received by openings of the structure to which the camera mounting device is to be mounted. This allows a single individual to easily install the camera mounting device.

The invention is described herein with reference to certain embodiments, but it is understood that the invention can be embodied in many different forms and should not be construed as limited to the embodiments set forth herein. In particular, the present invention is described below in regards to certain camera mounting device in different configurations, but it is understood that the invention can be used for many other devices having many different configurations. The components can have different shapes and sizes beyond those shown in the figures or discussed herein.

It is to be understood that when an element or component is referred to as being "on" another element or component, it can be directly on the other element or intervening elements may also be present. Furthermore, relative terms such as "between", "within", "below", and similar terms, may be used herein to describe a relationship of one element or component to another. It is understood that these terms are intended to encompass different orientations of the device in addition to the orientation depicted in the figures.

Although the terms first, second, etc. may be used herein to describe various elements or components, these elements or components should not be limited by these terms. These terms are only used to distinguish one element or component from another. Thus, a first element discussed herein could be termed a second element without departing from the teachings of the present application. It is understood that actual systems or fixtures embodying the invention can be arranged in many different ways with many more features and elements beyond what is shown in the figures.

Embodiments of the invention are described herein with reference to illustrations that are schematic illustrations. As such, the actual thickness of elements can be different, and variations from the shapes of the illustrations as a result, for example, of manufacturing techniques and/or tolerances are expected. Thus, the elements illustrated in the figures are schematic in nature and their shapes are not intended to illustrate the precise shape of a region of a device and are not intended to limit the scope of the invention.

With reference to FIGS. 1-9d, an exemplary camera mounting device 10 is shown. In some embodiments the camera mounting device 10 is configured such that the camera mounting device 10 can be mounted onto a structure 32 such that the structure 32 does not substantially block the view of a camera mounted onto the camera mounting device 10. The camera mounting device 10 comprises a base member 12 comprising a top surface 14 and a side surface 16, a clamping member 20 and an adjustment member 18, wherein said clamping member 20 and said adjustment member 18 are detachably coupled to said base member 12. The side surface 16 is adapted to receive said clamping member 20 and said top surface 14 is adapted to receive said adjustment member 18. The top surface 14 of said base member comprises at least one slot 22 to receive at least one fastener 24 so as to detachably couple said adjustment member 18 to said base member 12. The side surface 16 of said base member 12 comprises at least one aperture 36 to receive a clamping device 21 such that said clamping member 20 is detachably coupled to said base member 12.

The base member 12 is configured such that the top surface 14 and the side surface 16 are substantially perpendicular to each other. However, in other embodiments, the separation of the top surface 14 and the side surface 16 can form an acute or obtuse angle. In yet other embodiments, the separation between the top and side surfaces 14, 16 can be adjustable.

Figure 1:
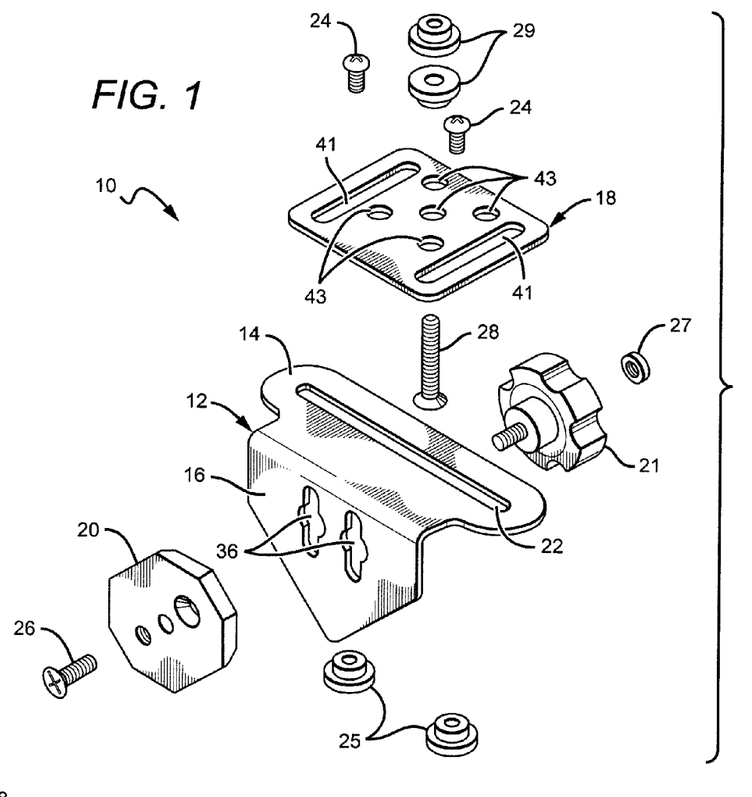
FIG. 1 is an exploded view of a camera mounting device according to an embodiment of the invention.
Figure 2:
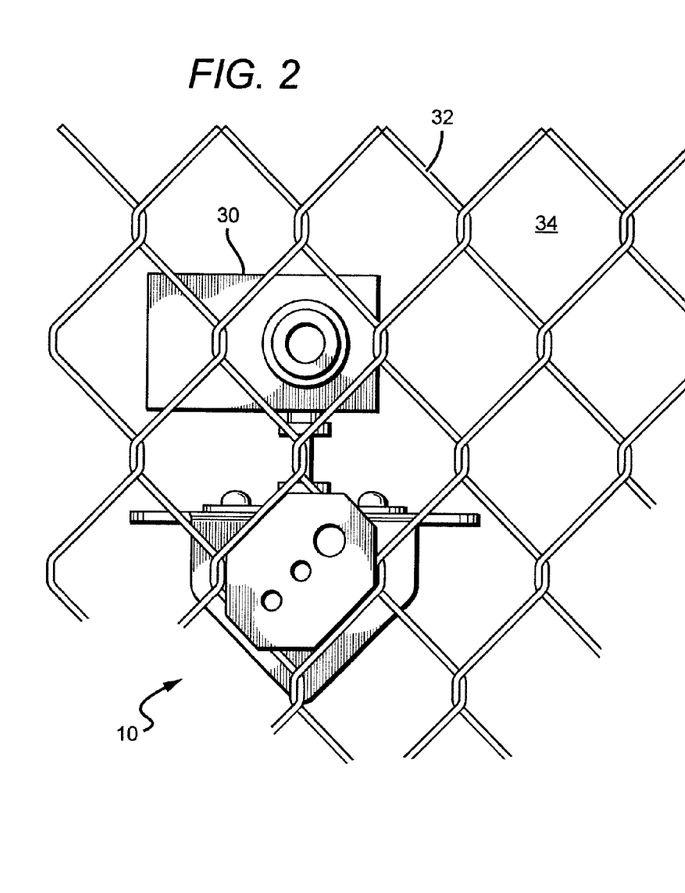
FIG. 2 is a front view of the camera mounting device of FIG. 1.
Figure 3:
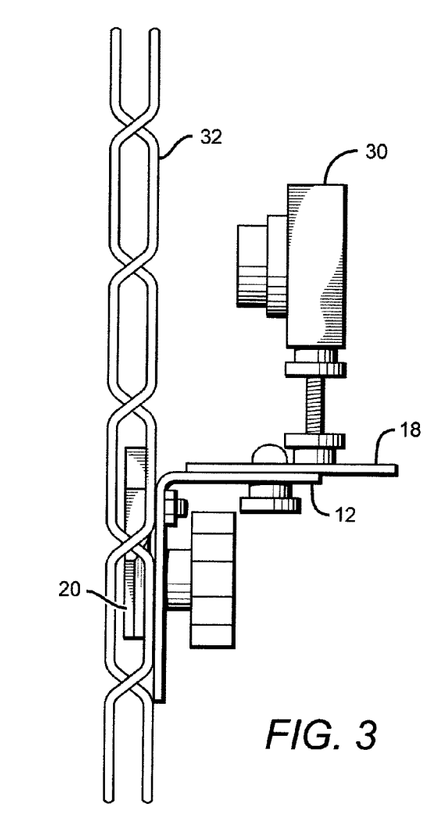
FIG. 3 is a side view of the camera mounting device of FIG. 1.
Figure 4:
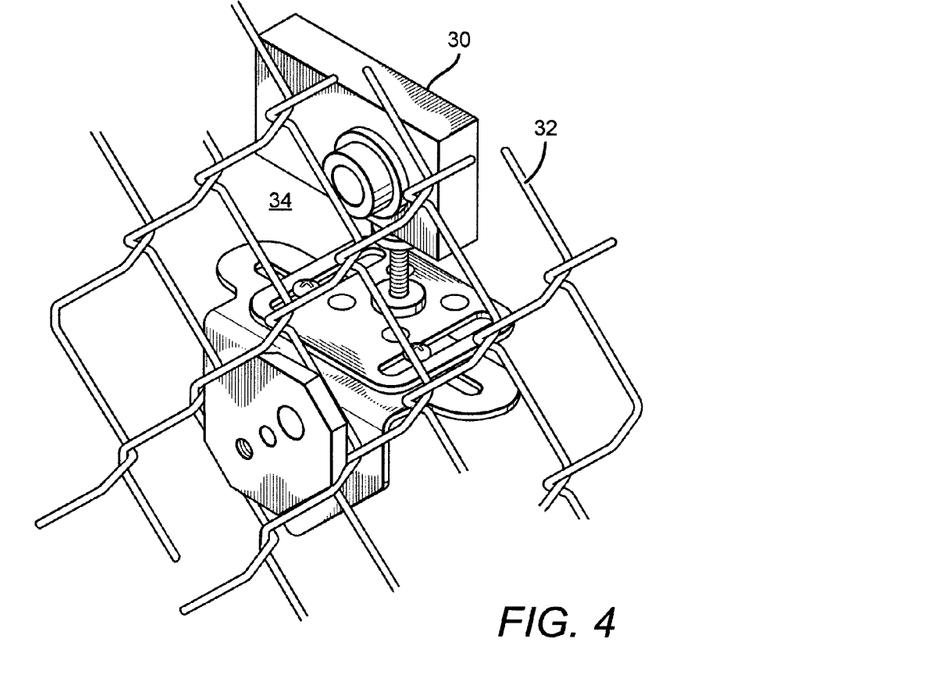
FIG. 4 is a perspective view of the camera mounting device of FIG. 1.
Figure 5:
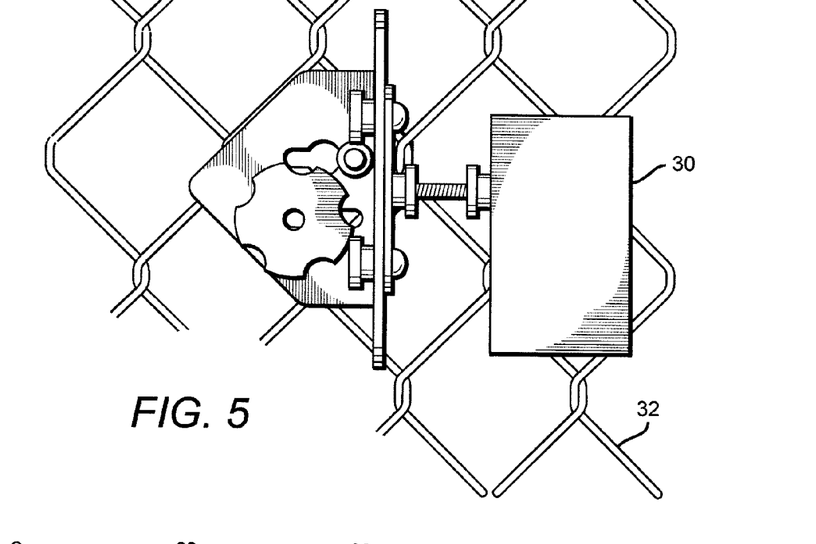
FIG. 5 is a rear view of the camera mounting device of FIG. 1.
Figure 6:
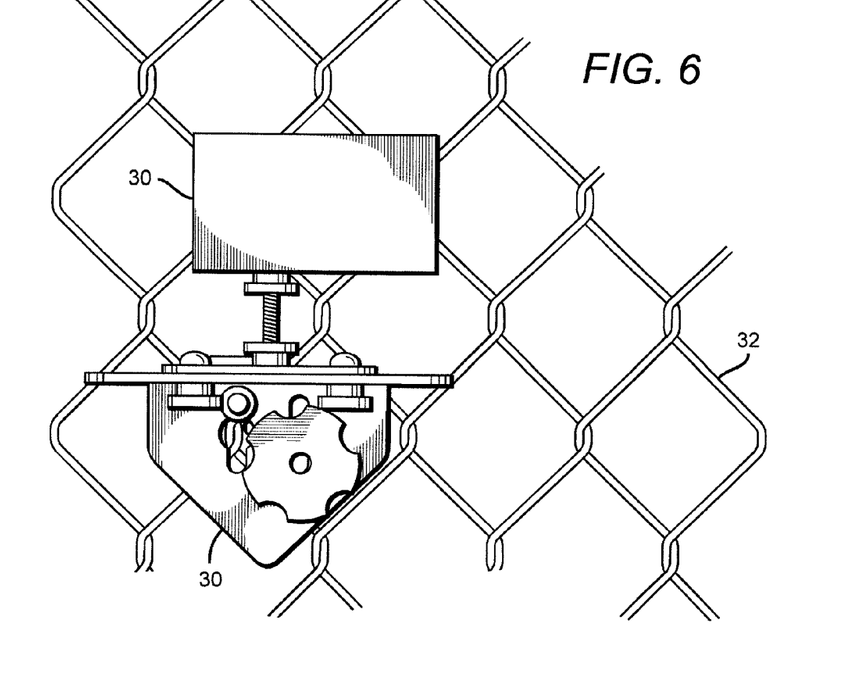
FIG. 6 is a rear view of the camera mounting device of FIG. 1.
Figures 7A, 7B:
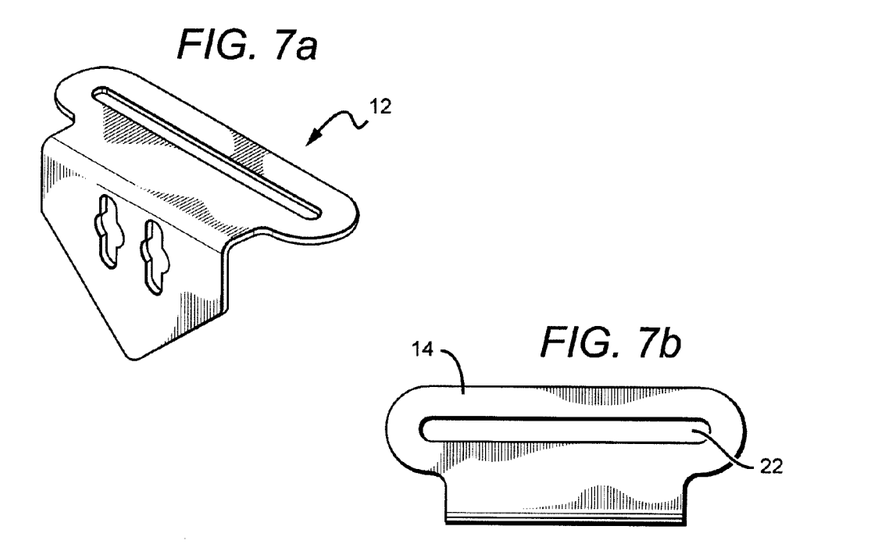
Figure 7C:
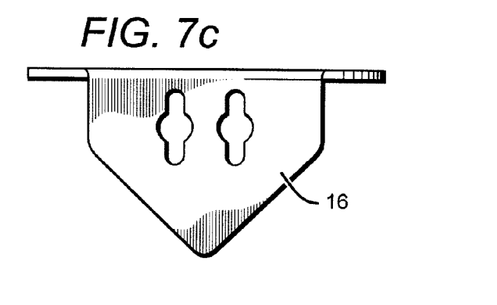
Figure 7D:
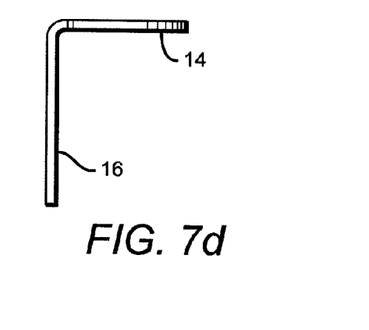

As shown in FIG. 1, the slot 22 of the top surface 14 receives the at least one fastener 24, wherein a respective nut 25 receives a respective fastener 24 so as couple the adjustment member 18 to the top surface 14. The adjustment member 18 comprises at least one bore 41, wherein the at least one fastener 24 extends through a respective bore 41, slot 22 and a respective nut 25 to couple the adjustment member 18 to the top surface 14. The fastener 24 shown in FIG. 1 can be threaded and the nut 25 can be configured to receive the threading of fastener 24. The invention is not intended to be limited to a threaded fastener 24 and nut 25. In other embodiments, the fastener 24 and nut 25 can be configured in many different ways so as to attach one element to another, such as but not limited to a bayonet-type connection.

Figure 8A:
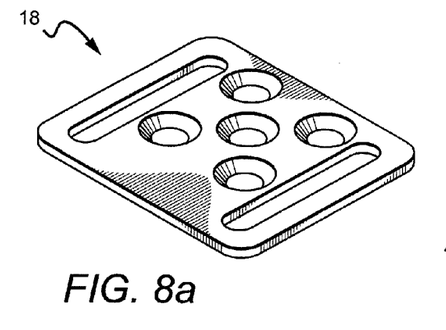
FIG. 8a is a perspective view of an adjustment member according to an embodiment of the invention.
Figure 8B:
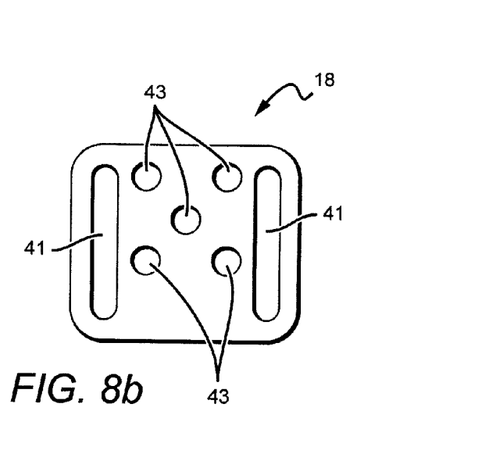
Figure 9A:
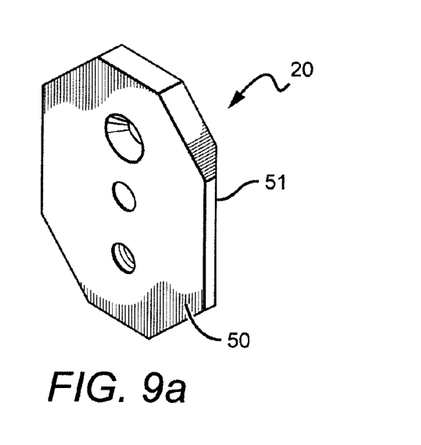
FIG. 9a is a perspective view of a clamping member according to an embodiment of the invention.
Figure 9B:
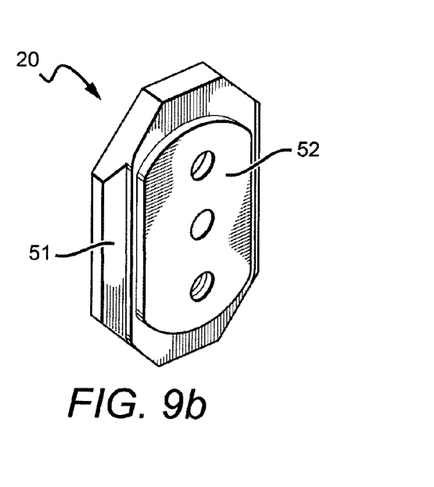
Figure 9C:
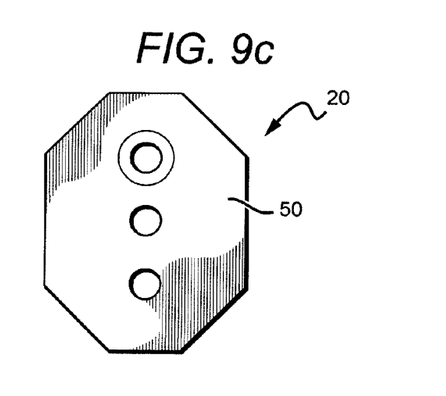
Figure 9D:
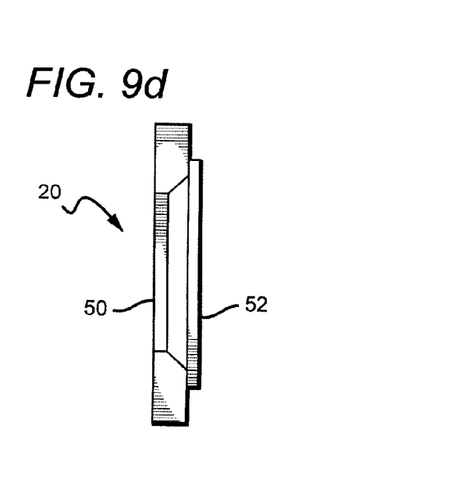

The slot 22 of the top surface 14 is arranged to allow the at least one fastener 24 to slide along the top surface 14 such that the positioning of the adjustment member 18 can be adjusted. FIGS. 1 and 7a-d show the slot 22 as a single elongated slot, however in other embodiments, the top surface can comprise a plurality of slots 22 that are individual slots 22 and elongated. The range that the adjustment member 18 can traverse is defined by the length of the slot 22. An advantage of the invention is that the slot 22 allows the positioning of the adjustment member 18 to be easily adjusted and fixed to a desired position. FIGS. 1 and 8a-b show the at least one bore 41 of the adjustment member 18 as a single elongated bore. The at least one bore 41 allows the positioning of the adjustment member 18 to be easily adjusted along the length of the at least one bore 41. The at least one bore 41 allows the adjustment member 18 to be moved closer or further from the structure 32 to which the device 10 is mounted, as shown in FIGS. 2-6. The embodiment of the device 10 in FIGS. 1 and 8a-b show that the adjustment member 18 comprises two bores 41 that are elongated. However, the adjustment member 18 can comprise one or a plurality of bores 18 and can be configured in many different ways, and is not intended to be limited to two bores. Yet another advantage of the invention is that the elongated bores 41 allow the adjustment member 18 to be rotated about at least one of the fasteners so that the adjustment member 18 is at an angle with respect to the base member 12 and/or the structure 32.

In some embodiments, the adjustment member 18 can comprise at least one hole 43 adapted to receive a pin 28, wherein the pin 28 extends through the at least one hole 43 and adapted to provide a mounting point to receive a camera 30 or similar device. In some embodiments, the pin 28 also receives at least one pin nut 29 which is arranged to provide structural support. FIGS. 1-6 show an embodiment of the invention wherein two pin nuts 29 are received by the pin 28. In such embodiments, one of the pin nuts 29 is arranged to securely fix the pin 28 to the adjustment member 18, and the other pin nut 29 is arranged to provide structural support to the camera 30 that is received by the pin 28. The pin nut 29 supports the camera 30 received by the pin 28 by changing the position of the pin nut 29 on pin 28, such that the pin nut 29 imparts a force on the camera 30 and limits movement of the camera 30 on the pin 28. In the embodiment of FIGS. 1-6, the position of the pin nut is changed by turning the pin nut on the threaded pin, and the pin nut position is fixed when the pin nut contacts and imparts a force onto the camera 30 on the pin 28. The pin nut positioning can be changed many different ways and is not intended to be limited to the embodiments disclosed herein. In other embodiments, the pin 28 receives a planar mount surface adapted to provide a mount surface to receive a camera or similar device.

The side surface 16 of the base member 12 comprises at least one aperture 36, wherein the at least one aperture 36 is wider at the central region and narrow at the end regions of the aperture 36. The central region can be circular shaped, but can also be shaped in many different shapes and is not intended to be limited to a circular shape. The at least one aperture 36 in cooperation with the clamping device 21 are arranged to detachably couple the clamping member 20 to the side surface 16. The clamping device 21 extends through the at least one aperture and is received by the clamping member 20 such that the clamping device 21 causes the clamping member 20 to exert a force on the side surface 16 so as to detachably couple the clamping member 20 to the side surface 16. In some embodiments, the clamping device 21 can be threaded and is received by the clamping member 20 such that rotation of the clamping device 21 pulls the clamping member 20 towards the side surface 16 and exerts a force on the side surface 16. The clamping device 21 can be configured in many different ways and is not intended to be limited to being threaded.

The clamping member 20 comprises a front surface 52 and a back surface 50 and beveled surfaces 51 between the front and back surfaces 52, 50. The front surface 52 and/or the beveled surfaces 51 are arranged to contact the structure 32 to which the device 10 is mounted. The clamping device 21 is configured to pull the clamping member 20 towards the side surface 16 and in the process, the front and/or the beveled surfaces 52, 51 exert a force on the structure 32, which causes the device 10 to be mounted on the structure 32. In one embodiment, the structure 32 can be a standard chain-link fence 32, however the structure 32 is not intended to be limited to a chain-link fence and can be any other fence or structure, such as but not limited to poles, walls, etc. An advantage of the invention is that the clamping member 20 is shaped to fit within an opening 34 of the structure 32 to which the device 10 is mounted. This allows the camera 30 mounted on the device 10 to be positioned proximate the structure 32 so that the camera 30 has a substantially unobstructed view. The device 10 allows the camera 30 to be mounted on a chain-link fence 32, for example as shown in FIGS. 2-6, and take pictures and/or video of events and/or scenery that is on the other side of the fence. Another advantage of the invention is that the device 10 allows the camera 30 to be mounted at a fixed position while not taking up too much space and thereby not blocking the view of other spectators that may be present. Chain-link fences have a plurality of openings 34 upon which the device 10 can be mounted to and yet allow the camera to have a substantially unobstructed view through one of the plurality of openings of the chain-link fence. The device can also be arranged such that the device is mounted at the top or highest part of the structure 32, such that the camera extends above the height of the structure 32.

In some embodiments the side surface 16 can have a plurality of apertures 36. As shown in FIG. 1, the side surface 16 comprises two apertures 36, wherein one aperture 36 receives the clamping device 21 and the other receives a clamping pin 26 that extends from the clamping member 20 and is received by a clamping nut 27. The clamping nut 27 is sized to fit within the central region of the aperture 36 but is bigger than the end regions of the aperture 36. The clamping nut 27 further assists in stabilizing and fixing the clamping member 20 to the side surface 16.

Figure 10A:
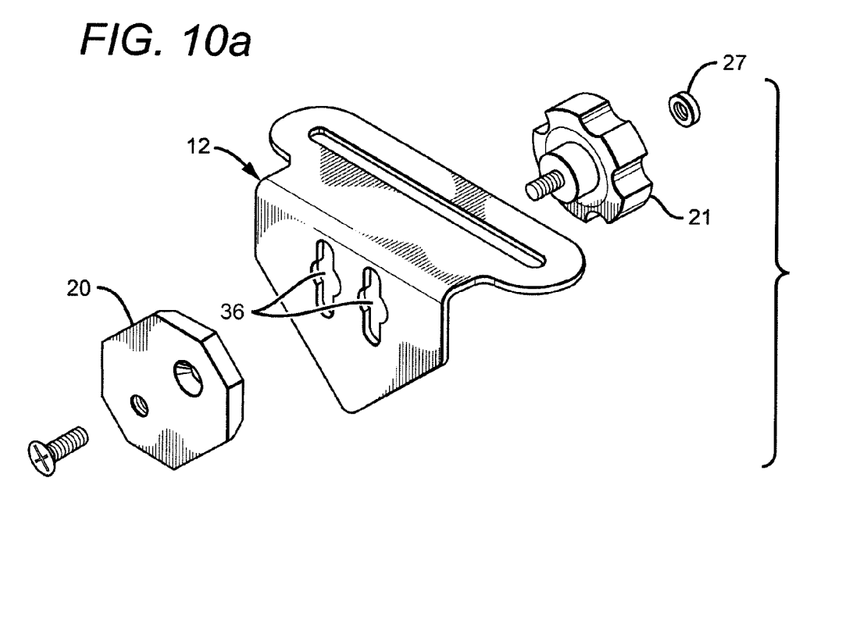
FIG. 10a is a perspective view of a camera mounting device according to an embodiment of the invention.
Figure 10B:
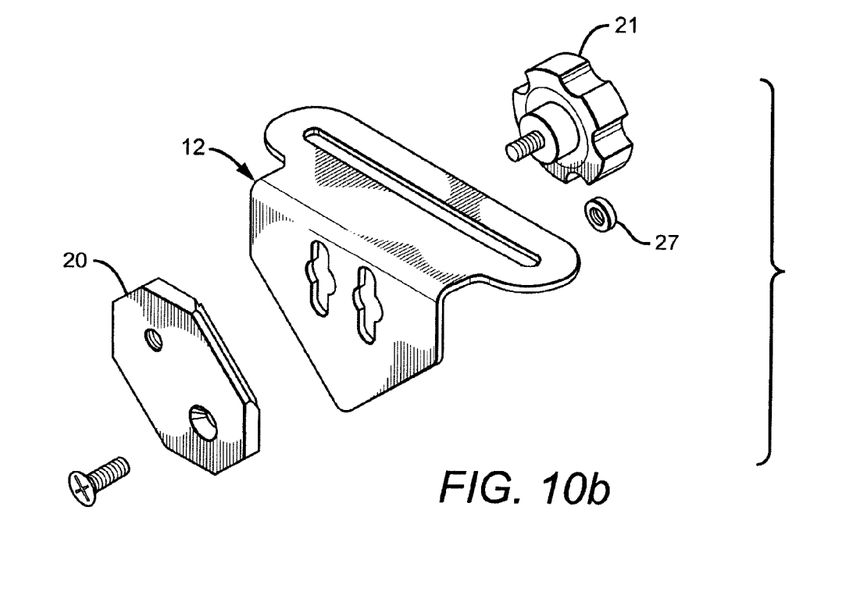
FIG. 10b is a perspective view of a camera mounting device according to an embodiment of the invention.
Figure 11:
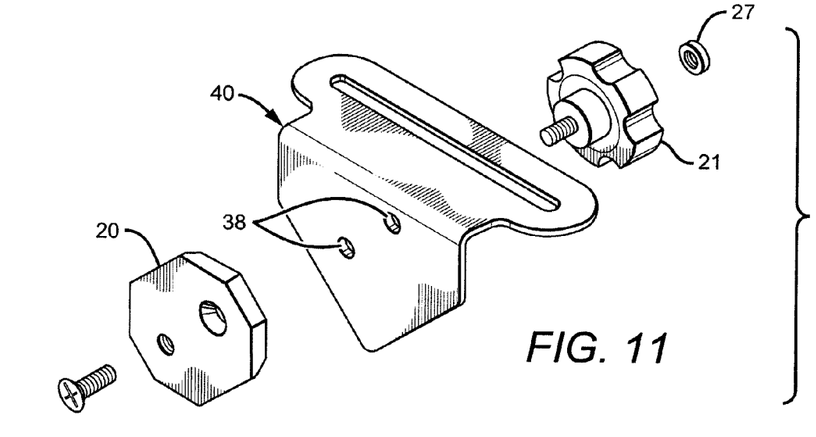
FIG. 11 is a perspective view of a camera mounting device according to an embodiment of the invention.

An advantage of the invention is that the clamping member 20 can be rotated to accommodate for differently configured structures 32. For example, the openings 34 of a chain-link fence 32 are oriented so that one set of opposite corners are aligned vertically and the other set of opposite corners are aligned horizontally. Because of the weaving of the wires of the chain-link fence 32, one set of parallel sides of the opening 34 are closer to the field of play than the opposite side of parallel wires of the opening 32. In a standard chain-link fence installation, the upper-right and lower-left sides are further from the field of play than the upper-left and lower right sides. However, in a rotated fence installation, the upper-left and lower-right sides are further from the field of play than the upper-right and lower-left sides (looking from the field of play side towards the fence). The device 10 is configured to clamp onto the sides of the opening 32 that are furthest from the field of play. FIGS. 10a and 10b show how the clamping member 20 can be reconfigured to accommodate for standard and rotated chain-link fence installations. The aperture 36 is configured to allow the clamping member 20 to be removed and rotated to accommodate for either fence installation. An advantage of the invention is that the aperture 36 allows the clamping nut 27 to extend through the aperture 36 and re-inserted into the other aperture 36 without having to fully disassemble the device 10. This can easily be performed by a single individual from the spectator side of the fence. The clamping member 20 of FIG. 11 is an embodiment that is only works for standard chain-link fence installations, which also allows for a single individual to easily mount the device 10 to the chain-link fence or similar structure.

Mounting the device 10 to the chain-link fence 32, as shown in FIGS. 2-6, provides the additional advantage of using the chain-link fence 32 to protect the device 10 and camera 30 mounted on the device from being damaged by projectiles and/or other objects that come into contact with the fence 32. Prior art camera fence mounting devices typically mount a camera to the top of the fence, such that the camera is located at a position higher than the fence. Placing the camera above the fence exposes the camera and mounting device to objects or projectiles that may travel towards the fence in a direction higher than the fence, which typically happens in various sporting events; the exposed camera could resultantly be damaged or destroyed. Other prior art camera fence mounting devices mount the camera on a side of the fence that is opposite the spectators, such that the fence is between camera and the spectators, is pointed in a direction away from the fence, and within the area where the sporting event or subject of interest is located or taking place. Placing the camera on the fence in this manner also exposes the camera and mounting device to being damaged or destroyed by projectiles, participants, and/or the events occurring on the side of the fence opposite the spectators. Furthermore, participants in the sporting event that is being recorded could be injured by the camera mounted on the fence within the field of play, due to the camera projecting outward from the fence into the field of play. The device 10 does not have such issues because the device 10 is configured to align the camera 30 within the opening 34 of the fence 32, such that the camera 30 is on the spectator side of the fence 32 and does not protrude onto the field of play where the sporting event or scenery is located. Because the camera 30 is disposed on the spectator side of the fence 32, the fence 32 naturally protects the camera 30 and device 10 from being damaged or destroyed from any projectiles that may travel towards the fence 32 which the device is mounted on. The device 10 can be made of many different materials, such as but not limited to metal, steel, aluminum, hard plastics, and the like or a combination thereof.

Figure 12:
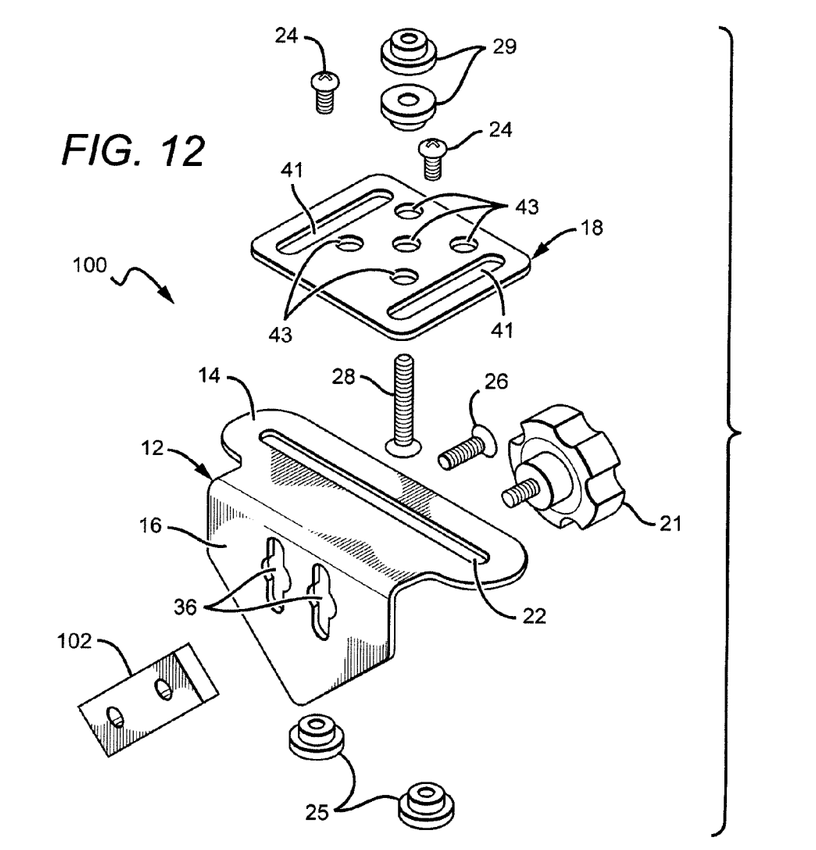
FIG. 12 is an exploded view of a camera mounting device according to an embodiment of the invention.

FIG. 12 discloses another embodiment of a camera mounting device 100 according to the invention. For the same or similar elements or features, the same reference numbers will be used throughout the application herein. The camera mounting device 100 is similarly configured and adapted to operate in a manner similar to the device 10 disclosed above. The camera mounting device 100 comprises a base member 12 and adjustment member 18, but comprises a clamping member 102 instead of the clamping member 20. The clamping member 102 and the adjustment member 18 are detachably coupled to the base member 12. The side surface 16 is adapted to receive the clamping member 102 and the top surface 14 is adapted to receive the adjustment member 18. The top surface 14 of the base member comprises at least one slot 22 to receive at least one fastener 24 so as to detachably couple the adjustment member 18 to the base member 12. The side surface 16 of said base member 12 comprises at least one aperture 36 to receive a clamping device 21 such that the clamping member 102 is detachably coupled to the base member 12, similarly as discussed above.

With reference to FIGS. 13a-d, the clamping member 102 comprises a front surface 106 and a back surface 104 and at least one ridge 108 on the front surface 106. The clamping member 102 and the base member 12 are arranged to contact the structure 32 in order to mount the camera mounting device 100 to the structure 32, such that the structure 32 is interposed between the base member 12 and the clamping member 102. The front surface 106 of the clamping member 102 comprises at least one ridge 108 which forms a lowered surface 112 proximate the ends 114 of the clamping member 102 and extending towards the ridge 108. In the embodiment of FIGS. 13a-d, the clamping member 102 comprises two ridges 108, such that the clamping member 102 comprises two lowered surfaces 112 and a raised surface 113 between the two ridges 108. However, in other embodiments, the clamping member 102 can comprise one or more ridges 108 and/or one or more raised and lowered surfaces.

The lowered surfaces 112 are arranged to receive the structure 32 such that the clamping member 102 can be securely fixed to the base member 12, wherein the clamping member 102 is arranged to contact at least part of the structure 32 and the base member 12. The clamping device 21 is configured to exert a pulling force onto the clamping member 102, pulling the clamping member 102 towards the side surface 16 of the base member 12 such that the raised and/or lowered surfaces 113, 112 exert a force on the structure 32, which causes the device 100 to be mounted on the structure 32. In some embodiments, the clamping device 21 has a threaded fastener and the clamping member 102 is also threaded to receive the threaded fastener, such that threading the clamping device 21 onto the clamping member 102 exerts the force onto the clamping member 102 towards the side surface 16. However, the clamping device 21 can be arranged in many different ways and is not intended to be limited to a threaded fastener. In other embodiments, the clamping device 21 can comprise many different types of fasteners, such as but not limited to a nail, rivet, bolt, or the like.

In some embodiments the structure 32 can be a standard chain-link fence 32, however the structure 32 is not intended to be limited to a chain-link fence and can be any other fence or structure as discussed above. An advantage of the invention is that the clamping member 102 is shaped to fit within an opening 34 of the structure 32 to which the device 100 is mounted. This allows the camera 30 mounted on the device 100 to be positioned proximate the structure 32 so that the camera 30 has a substantially unobstructed view. The device 100 allows the camera 30 to be mounted on a chain-link fence 32 or similar structure, in a similar manner as discussed above as shown in FIGS. 2-6.

The clamping member 102 is arranged such that the raised surface 113 is approximately the same size as the opening 34 of the structure 32 to which the device 100 is mounted. The raised surface 113 being approximately the same size as the opening 34 allows the device 100 to be securely mounted to the structure 32. When the device 100 is mounted to the structure, the lowered surfaces 112 receive and/or contact the structure 32 and the raised surface 113 is received by and within the opening 34. The opening 34 and the raised surface 113 having similar dimensions allows the device 100 to be properly mounted to the structure 32, such that the clamping member 102 remains within the opening 34 and does not move and/or shift within the opening when the device 100 is mounted to the structure 32. Yet another advantage of the invention is that the configuration of the clamping member 102 assists in the proper mounting of the device 100 to the structure 32 because the raised surface 113 is arranged to be within the opening 34 of the structure 32 and not arranged to contact the structure 32. However, in other embodiments, the clamping member 102 can be configured such that the raised surface 113 can contact the structure 32 in order to mount the device 100 to the structure 32.

Figure 13A:
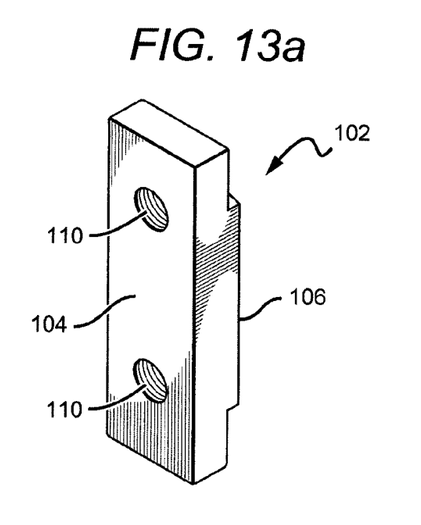
FIG. 13a is a perspective view of a clamping member according to an embodiment of the invention.
Figure 13B:
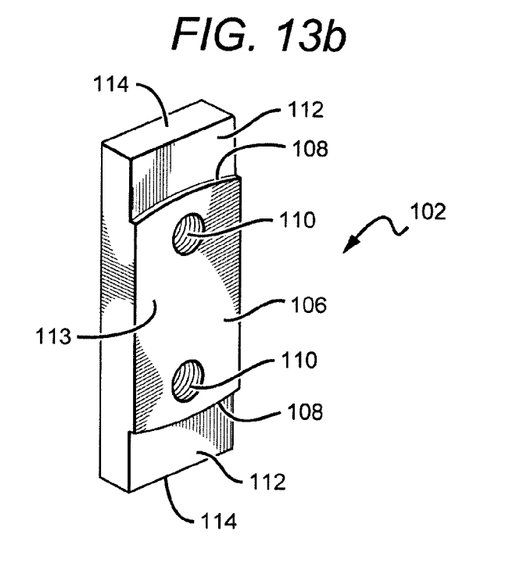
Figure 13C:
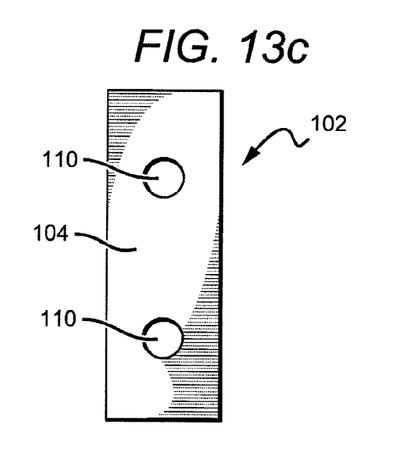
Figure 13D:
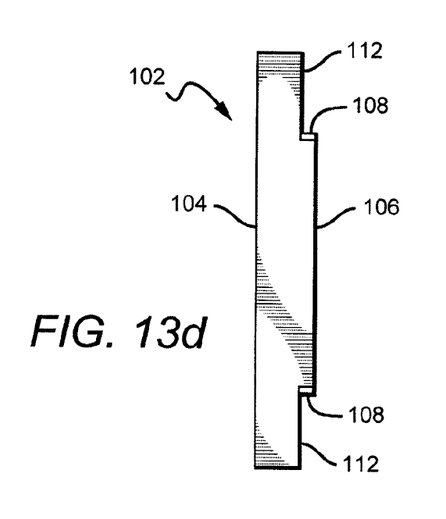

In some embodiments the clamping member 102 can have a plurality of openings 110. As shown in FIGS. 12-13d, the clamping member 102 comprises two openings 110, however, the invention is not intended to be limited to two openings 110. In other embodiments, the clamping member 102 can comprise one or more openings 110. In the embodiment of FIGS. 12-13d, the openings 110 are adapted to receive a clamping pin 26 and a clamping device 21, and the side surface 16 comprises two apertures 36, wherein one aperture 36 receives the clamping device 21 and the other receives a clamping pin 26 that extends from the clamping member 102. The clamping pin 26 is received by the clamping member 102 via the front surface 106 of the clamping member 102, as well as the clamping device 21. The clamping pin 26 is sized to fit within the central region of the aperture 36 but is arranged to be bigger than the end regions of the aperture 36. The clamping pin 26 further assists in stabilizing and fixing the clamping member 102 to the side surface 16.

In some embodiments the side surface 16 can have a plurality of apertures 36. In one embodiment, as shown in FIG. 12, the side surface 16 comprises two apertures 36, wherein one aperture 36 receives the clamping device 21 and the other receives a clamping pin 26 that is received by and extends from the clamping member 102. The clamping pin 26 is sized to fit within the central region of the aperture 36 which is bigger than the end regions of the aperture 36. The clamping pin 26 further assists in stabilizing and fixing the clamping member 20 to the side surface 16.

An advantage of the invention is that the clamping member 102 can be rotated to accommodate a variety of structures 32, similarly as discussed above. Rotation of the clamping member 102 can be performed due to the configuration of the aperture 36. As stated above, the center portion of the aperture is bigger than the end portions of the aperture, which allows the clamping pin 26 to extend through and out the center portion of the aperture, while being coupled to the clamping member 102. After rotating the clamping member 102, the clamping pin 26 is inserted into the other aperture 36 through the center portion. The rotation of the clamping member 102 can easily be performed by a single individual from the spectator side of the fence.

Although the invention has been described in considerable detail with reference to certain configurations thereof, other versions are possible. For instance, the device can be rotated such that the camera 30 is horizontally or vertically aligned. The device 10 can also be configured such that the camera 30 can be rotated to be pointed away from the fence 32 to which the device 10 is mounted. Furthermore, the device is not limited to receive a camera 30, other audio-visual recording devices can be mounted onto the device. Therefore, the spirit and scope of the invention should not be limited to the versions described above.

I claim:

1. A mounting device, comprising:
   a base member having a top surface and a side surface;
   an adjustment member removably coupled to said base member;
   a clamping member removably coupled to said base member, wherein said adjustment member is removably coupled to said top surface and said clamping member is removably coupled to said side surface, said clamping member comprising a front surface and a back surface, said front surface comprising at least one ridge, at least one lowered surface and at least one raised surface, wherein said front surface faces said side surface of said base member;
   a clamping device received by said clamping member and said side surface to removably couple said clamping member to said side surface; and
   at least one fastener received by said adjustment member and said top surface to removably couple said adjustment member to said top surface.

2. The mounting device of claim 1, said base member further comprising:
   at least one slot extending along part of said top surface; and
   at least one aperture on said side surface, wherein said at least one aperture comprises a central region and at least one end region, wherein said aperture at said central region is bigger than at said at least one end region.

3. The mounting device of claim 2, wherein said adjustment member comprises at least one bore, wherein said at least one fastener is received by said at least one bore and said at least one slot of said top surface to removably couple said adjustment member to said top surface.

4. The mounting device of claim 2, wherein said clamping member comprises at least one opening such that said clamping device is received by said at least one aperture of said side surface and said at least one opening of said clamping member to removably couple said clamping member to said side surface.

5. The mounting device of claim 4, wherein said clamping member comprises a plurality of openings and said side surface comprises a plurality of apertures, wherein said clamping device is received by a respective one of said plurality of openings and a respective one of said plurality of apertures, and a clamping pin is received by a second one of said plurality of apertures and a second one of said plurality of openings to removably couple said clamping member to said side surface.

6. The mounting device of claim 4, wherein said clamping device exerts a force onto said clamping member to removably couple said clamping member to said side surface of said base member, such that said mounting device is mounted to a structure interposed between said base member and said clamping member.

7. The mounting device of claim 6, wherein said clamping device causes said side surface and said clamping member to exert a force onto said structure interposed between said base member and said clamping member to mount said mounting device to said structure.

8. The mounting device of claim 4, wherein said at least one lowered surface is proximate the ends of said clamping member and extends towards said ridge, and said at least one raised surface proximate said at least one opening of said clamping member.

9. The mounting device of claim 1, wherein said adjustment member at least partially rotates about said at least one fastener, such that said adjustment member is at an angle with respect to said base member.

10. The mounting device of claim 1, wherein at least one nut receives said at least one fastener to couple said adjustment member to said top surface of said base member.

11. The mounting device of claim 1, wherein said adjustment member comprises at least one hole, a pin received by said at least one hole and at least one pin nut to couple said pin to said adjustment member.

12. The mounting device of claim 11, wherein said pin extends beyond said pin nut to provide an exposed portion of said pin extending beyond said pin nut to provide a mounting point, such that an external device can be mounted to said mounting point.

13. The mounting device of claim 12, wherein said external device is a camera, such that said camera is mounted onto said mounting device.

14. The mounting device of claim 11, wherein said pin receives a substantially planar mount surface to provide a mount surface.

15. A mounting device, comprising:
a base member comprising a top surface and a side surface, wherein said top surface comprises an elongated slot;
an adjustment member removably coupled to said top surface of said base member, wherein at least one fastener is received by said adjustment member and said elongated slot to removably couple said adjustment member to said top surface, wherein said at least one fastener is slidably received within said elongated slot such that the position of said adjustment member can be laterally adjusted along said elongated slot of said top surface;
a clamping member removably coupled to said side surface of said base member in order to mount said mounting device to a structure, wherein part of said structure is interposed between said clamping member and said side surface of said base member, wherein said clamping member exerts a force onto part of said structure interposed between said clamping member and said side surface to mount said mounting device to said structure.

16. The mounting device of claim 15, said clamping member comprising a front surface and a back surface, said front surface comprising at least one ridge, at least one lowered surface and at least one raised surface.

17. The mounting device of claim 15, said adjustment member comprising at least one bore to receive a respective one of said at least one fastener.

18. The mounting device of claim 15, said adjustment member comprising at least one hole, wherein a pin extends through said at least one hole and provides a mounting point.

19. The mounting device of claim 18, wherein a camera is received by said mounting point.

* * * * *